UNITED STATES PATENT OFFICE.

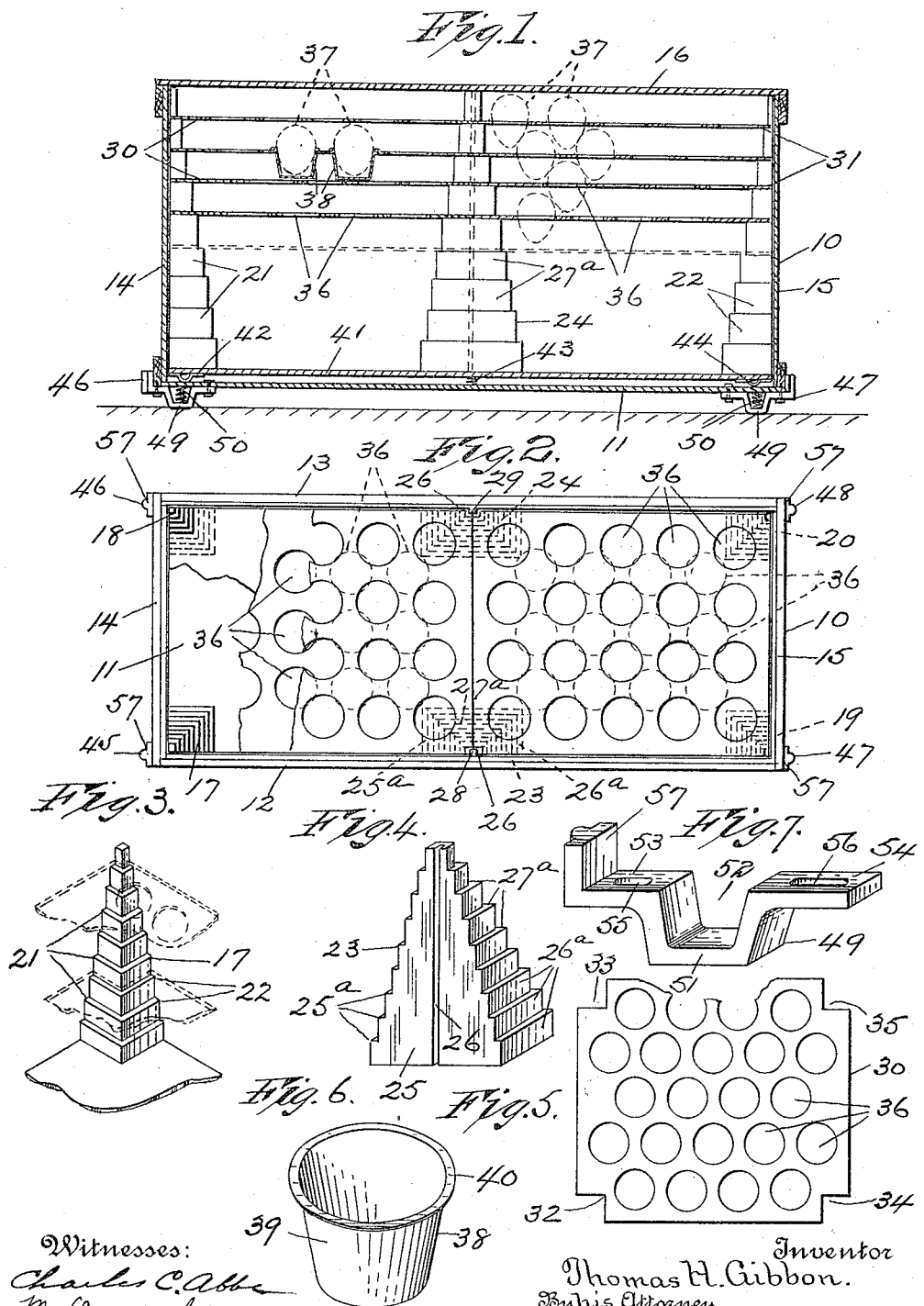

THOMAS H. GIBBON, OF ASTORIA, NEW YORK.

EGG-CRATE.

1,139,669.

Specification of Letters Patent.

Patented May 18, 1915.

Application filed February 4, 1914. Serial No. 816,535.

*To all whom it may concern:*

Be it known that I, THOMAS H. GIBBON, a citizen of the United States, and a resident of Astoria, county of Queens, and State of New York, have invented a certain new and useful Improvement in Egg-Crates, of which the following is a full, clear, and exact specification.

This invention relates to a class of crates adapted to be used for transporting eggs.

My invention has for its object primarily to provide an egg crate designed to be employed for enabling eggs to be readily packed therein, and safely transported, or stored, and wherein is provided a casing in which are arranged a number of supports, or uprights each formed with a corresponding number of superposed steps of different widths longitudinally so as to be disposed on an incline with relation to each other. On the steps of the uprights are removably mounted a plurality of trays having openings therethrough for reception of the eggs, and these apertured trays are spaced apart sufficient distances to permit the eggs to be carried by the trays in suspension, thereby largely overcoming the danger of breakage of the eggs while being transported, or when the crate may be moved from place to place.

Other objects of the invention are to provide in the casing a movable false bottom which supports the uprights and the trays; to provide spring actuated means which serve as cushions for the false bottom in order to obviate shocks to the eggs when the crate is moved; to provide upon the bottom of the crate and at the corners thereof yielding elements, or buffers whereby jarring of the crate from impact caused by contact with another body will be overcome; and to provide cups adapted to be removably inserted in the apertures of the trays so that the variations in the sizes of eggs may be compensated for to permit large, medium, or small eggs to be safely carried in the crate.

With these and other objects in view, the invention will be hereinafter more particularly described with reference to the accompanying drawing forming a part of this specification in which similar characters of reference indicate corresponding parts in all the views, and will then be pointed out in the claims at the end of the description.

In the drawing, Figure 1 is a longitudinal vertical section through one form of egg crate embodying my invention. Fig. 2 is a top plan, partly broken away of the crate, with its top removed therefrom. Fig. 3 is a fragmentary view showing an elevation of one of the uprights at the corners interiorly of the casing. Fig. 4 is an elevation of two of the center uprights used in the casing. Fig. 5 is a top plan, partly fragmentary, of one of the apertured trays of the crate. Fig. 6 is an enlarged perspective view of one of the cups for retaining the eggs in the apertures of the tray, and Fig. 7 is an enlarged perspective view of a part of one of the buffers employed on the bottom of the crate.

The egg crate has a casing 10 which is substantially rectangular in shape, and this casing is constructed with a bottom 11, side walls 12 and 13, end walls 14 and 15, and a cover as 16, all of which may be made of any suitable material.

Within the casing 10 at each corner thereof is provided four corresponding supports, or uprights 17, 18, 19, 20, all of which are substantially square as viewed transversely. Each of the uprights 17, 18, 19, 20, has two vertically disposed smooth surfaces at right angles to each other so as to movably fit against the opposed parts of the inner surfaces of the side walls and end walls of the casing of the create. The opposite surfaces of each of the uprights are tapered from the bottom to the top thereof, and these surfaces are angularly cut-out at equal distances to form a series of superposed steps, as 21 and 22, of different widths longitudinally so that the steps of each series will be disposed on an incline with relation to each other. Also within the casing 10, and centrally of the side walls 12 and 13 thereof are two supports, or uprights 23 and 24, both of which are substantially rectangular as viewed transversely, and each of these uprights has a vertically disposed smooth surface 25 in the center of which is a vertical groove 26. The three other surfaces of each of the uprights 23 and 24 are correspondingly tapered from the bottom to the top thereof, and these surfaces are cut-out at equal distances to form three series of superposed steps $25^a$, $26^a$, $27^a$ of different widths longitudinally so that the steps of all of the series will be disposed on similar inclines with relation to each other as well as corresponding to the steps of the uprights 17, 18, 19, 20. When the uprights 23 and 24 are disposed in the casing 10 each is disposed so that its vertical smooth surface will movably abut against the inner surface of one of the side walls of the casing, and to hold said uprights against lateral movement, but permit these uprights to move in upward or downward directions, on the side walls are provided stays 28 and 29. The stays 28 and 29 are slightly smaller in dimensions than the grooves 26, and in each groove is seated one of the stays.

The corresponding steps of all of the uprights are on the same relative plane. Removably mounted on each set of the steps 21 and 22 of the uprights 17 and 18, and also removably mounted on similar sets of the steps 25ª and 27ª of the uprights 23 and 24 are a number of substantially rectangular trays 30. Likewise removably mounted on each set of the steps 21 and 22 of the uprights 19 and 20 as well as being removably mounted on the similar sets of the steps 27ª and 26ª are a number of substantially rectangular trays 31. Each of the trays 30 and 31 has its corners cut-out, as at 32, 33, 34, 35, so as to rest upon the top of its respective set of the steps and fit between its supporting uprights to avoid shifting, or accidental displacement, and through each of the trays are a number of spaced openings 36 adapted to receive eggs 37. The openings 36 of the alternate trays of each set in the casing are spaced apart so that the openings of the intermediate trays will correspond to the parts of the trays above and below which are between each pair of the openings thereof. The eggs in each tray will thereby be disposed in staggered relation with the eggs in the tray thereunder, as shown in Fig. 1, and the risers of the steps of all the uprights of the casing are of sufficient heights to space the trays of each set apart for the eggs to be clear of contact with the trays above and below whereby the eggs will be held in suspension in the casing.

In order to compensate for the variations in the sizes of eggs to permit large, medium, or small eggs to be readily accommodated in the trays, I provide a suitable number of cups, as 38. Each of the cups 38 has an annular wall 39 with a closed lower end, and this wall is of a diameter to adapt it to fit snugly in any opening of the trays. The wall 39 of each cup tapers toward its lower end, and extending outwardly from the upper peripheral edge of the wall of each cup is an annular flange 40. The cups and all of the trays are made of cardboard, or other yielding material adapted to safely hold the eggs, and when packing the crate with eggs which are too small to be held in suspension in the openings proper of the trays each egg is disposed in one of the cups 38, and the cup with its egg is then inserted in one of the openings of the trays, thus eggs of all sizes may be properly packed in the crate for safe transportation.

All of the uprights and the trays are supported in the casing 10 upon a movable false bottom, as 41, and serving as cushions for the false bottom to avoid shocking, or breakage of the eggs in the crate when moved, to the parts of the underside of the false bottom which support the uprights are secured the upper ends of a number of springs as 42, 43, 44. The springs 42, 43, 44 may be of the usual, or any preferred forms so that the lower ends thereof will rest upon the inner surface of the bottom 11 of the casing 10 of the crate. In this manner the false bottom, the uprights, and the trays will yieldingly move sufficiently in the casing 10 to overcome damage to the eggs due to shocking of the crate when being transported from place to place.

For the purpose of preventing jarring of the crate from impact by contact with another body, a number of yielding elements, or buffers, as 45, 46, 47, 48 are provided. All of the buffers 45, 46, 47, 48 are alike in formation, and one of the buffers is positioned upon the bottom of the casing 10 of the crate at each corner thereof. Each of the buffers has a resilient member 49 and a co-acting spring member 50. The members 49 are made of rubber, or other resilient material, and each of said members has a substantially U-shaped body part 51, whereby a recess 52 is provided therein. Extending in alinement in opposite lateral directions from the free ends of each body part are two arms 53 and 54 each of which has an elongated opening, as 55 and 56, therethrough, and upon the free end of the arm 55 of each of the resilient members 49 is an upwardly projecting flange 57. In the recess 52 of the body part of each of the members 49 is provided one of the members 50, and each of the members 50 is preferably in the form of a spiral spring. When the buffers 45, 46, 47, 48 are applied to the crate the resilient member and the spring member of each buffer are assembled, and one of the buffers is disposed on the underside of the bottom of the casing 10 at each corner thereof so that its flange 57 will abut against the lower part of the wall adjacent to its respective corner of the casing. By means of screws, or bolts passed through the elongated openings 55 and 56 the buffer will then be held to the casing 10 against accidental displacement. The screws, or bolts which connect the buffers to the casing are preferably smaller than the elongated openings 55 and 56 to permit the arms of the resilient members to move under excessive weight upon the crate, thereby preventing jarring of the eggs therein, while the flanges 57 will serve to relieve the force of impact upon the crate when moved in contact with another body.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. In an egg crate, a rectangular casing, a plurality of vertically disposed supports removably disposed in the casing, one at each corner and one midway of each of the sides of the casing, all of said supports having a series of angular steps tapering from the bottom to the top thereof, and all of said supports being disposed upon a false bottom removably positioned within the casing, a plurality of trays removably supported on the angular steps of the supports one above another and each having a plurality of openings for receiving eggs and holding them at suitable distances from one another whereby the eggs are prevented from coming in contact; in combination with means comprising springs secured to the under side of the false bottom for preventing jarring the eggs when the crate is handled, and buffers secured to the corners of the bottom of the crate, substantially as shown and described.

2. In an egg crate of the character described, having a substantially rectangular casing, a bottom, and a false bottom, upright tapering stepped supports, one in each of the corners of the crate, two supports, one midway of each of the side walls thereof, said supports being disposed upon the false bottom, and said supports midway of the side walls being provided with grooves extending vertically in the side thereof adjacent to the wall, a guide on each side wall removably fitting in the groove of the adjoining support, a plurality of trays disposed one above the other on the steps of the supports, and each tray having a plurality of openings for receiving eggs, and a plurality of cups fitting in the openings of the trays so as to vary the size of the openings for accommodating eggs of various sizes, substantially as shown and described.

This specification signed and witnessed this third day of February A. D. 1914.

THOMAS H. GIBBON.

Witnesses:
ROBT. B. ABBOTT,
M. DERMODY.